Sept. 23, 1924.
A. ROCHWITE
1,509,489
INSECT SWATTER
Original Filed Jan. 14, 1922
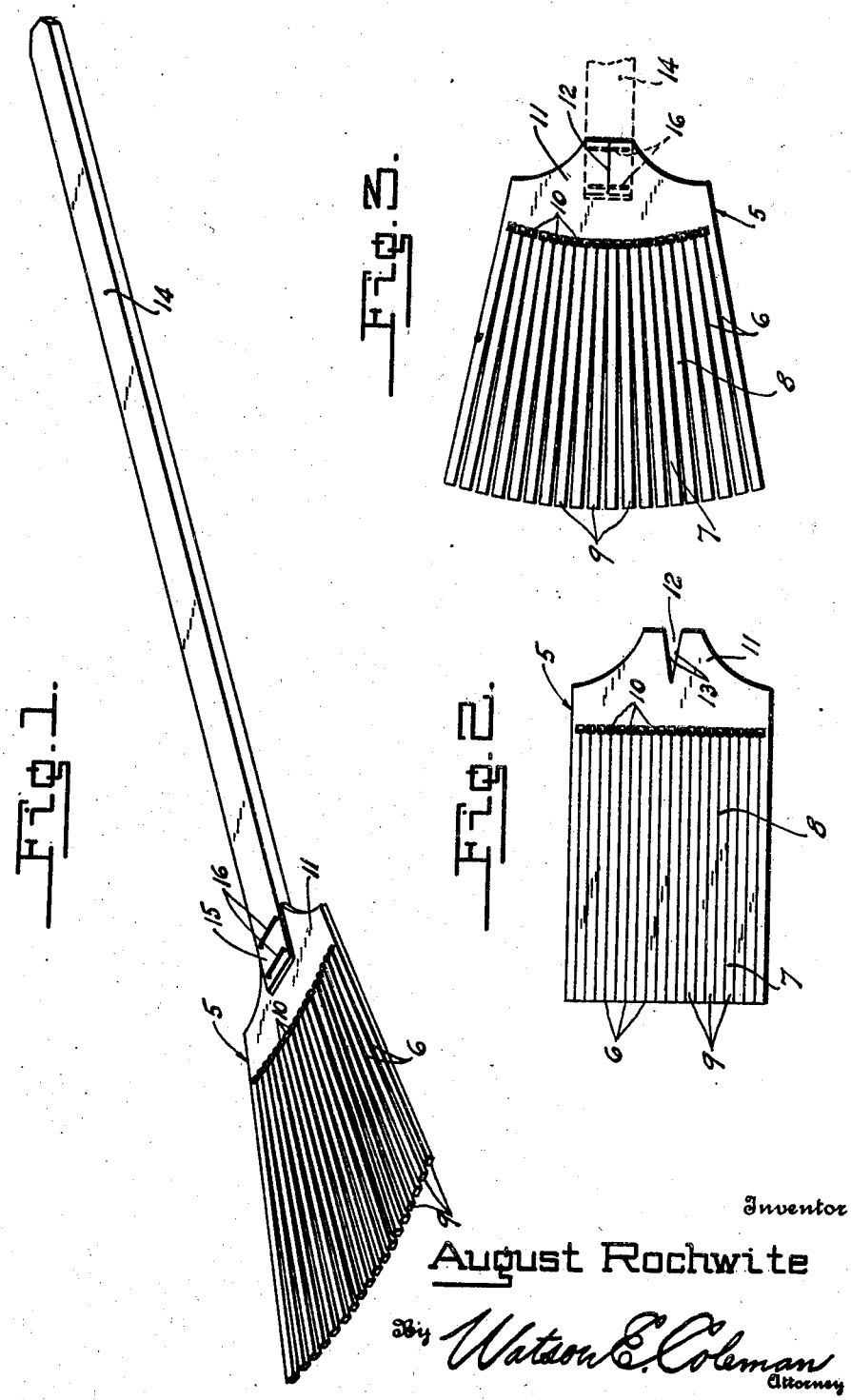
Inventor
August Rochwite
By Watson E. Coleman
Attorney Patented Sept. 23, 1924.

1,509,489

UNITED STATES PATENT OFFICE.

AUGUST ROCHWITE, OF HARTFORD, WISCONSIN.

INSECT SWATTER.

Application filed January 14, 1922, Serial No. 529,320. Renewed February 27, 1924.

*To all whom it may concern:*

Be it known that I, AUGUST ROCHWITE, a citizen of the United States, being naturalized after the execution of the application papers, residing at Hartford, in the county of Washington and State of Wisconsin, have invented certain new and useful Improvements in Insect Swatters, of which the following is a specification, reference being had to the accompanying drawings.

This invention relates to insect swatters and has for its object to provide a device of this character which may be operated with rapidity and accuracy.

Another object of the invention is to provide a device of this character having a flexible swatter member including a plurality of lashes which positively prevent the escape of the insect from beneath the swatter.

It is also an object of the invention to provide a swatter of this character wherein the lashes are capable of striking the insect independently of the adjacent lashes, so that the destruction of the insect is assured.

It is a further object of the invention to provide a device of this character wherein the swatter member is provided with a recess or gore remote from the lashes, the walls of said gore being adapted to contact when the swatter member is engaged with the handle to permit spreading of the lashes.

With these and other objects in view, the invention consists in the improved construction and arrangement of parts to be hereinafter more particularly described, fully claimed and illustrated in the accompanying drawings, in which:—

Figure 1 is a perspective view of an insect swatter constructed in accordance with an embodiment of the invention;

Figure 2 is a plan view of the swatter, showing the position of the lashes before the handle is applied;

Figure 3 is a plan view showing the position of the gore when the handle is applied and secured by the staples.

Referring to the drawings, 5 designates the body member of the swatter, said body member being preferably formed from substantially semi-flexible and rigid material, such as leather, rubber, fiber, etc. The body member 5 is provided with a plurality of longitudinally extending slits 6 which divide the end portion 7 and central portion 8 of the body member into a plurality of lashes 9, said lashes being relatively narrow and disposed closely adjacent each other, in view of the slits. By this means, when the swatter descends upon an insect, the lashes adjust themselves to conform to the size of the insect so that there is no possibility of the insect escaping from beneath the swatter.

In order to prevent the adjustment of the lashes as above described, a plurality of indentations 10 are provided between each lash, or at the end of the slits forming the lashes, said indentations substantially aligning one end portion of each lash so that said lashes will partially spread or radiate with respect to the end portion 11 of the body member. At the same time the indentations serve to strengthen the connection of the lashes with the body member or end portion 11.

To further assist in maintaining the lashes in their proper position, a triangular recess or gore 12 is provided in each of the end portions 11. The walls 13 of the recess are adapted to substantially engage each other so as to cause the lashes to substantially radiate from the end portion 11 and provide a swatter which is fan-shaped so that the slits between each of the lashes substantially taper from the free ends of the lashes inwardly to the base of the lashes.

In connection with the swatter a handle member 14 is provided, said handle member being made of any length desired and has its end portion 15 bifurcated for the reception of a portion of the end portion 11 of the swatter. In assembling the swatter, the end portion 15 of the handle member is positioned centrally of the end portion 11 so that the gore 13 will be disposed inwardly of the bifurcation of the handle. The operator then positions the end portion 11 so as to cause the walls 13 of the recess to move toward each other and while the walls 13 are held in engagement with each other, staples 16 are passed through the end portion 15 of the handle and the portion of the swatter adjacent the recess 12, thereby permanently holding the lashes separated and producing a swatter member that is substantially fan shaped.

From the foregoing it will be readily seen that this invention provides a novel form of insect swatter which is simple in construction, practical, and can be produced in large quantities at a small cost. An important feature of this swatter is that there is no danger of the outer or free ends of the lashes interfering with the adjacent lashes when destroying an insect, and at the same time, in view of its novel arrangement, it is possible to construct the swatter of substantial material, or in other words, material capable of indefinitely maintaining its shape, such as leather, without the use of reinforcing means.

What is claimed is:—

1. A swatter of the character described comprising a body member having a multiple of lashes extending longitudinally thereof and terminating adjacent one end of the body member, said end of the body member being provided with a recess, the confronting walls of the recess being adapted to substantially engage each other to cause spreading of the lashes.

2. A swatter of the character described comprising a flexible body member having a multiple of slits extending longitudinally thereof and terminating adjacent one end of the body member, said slits dividing the central portion and one end of the body member into a multiple of lashes, the opposite end of said body member having a gore disposed at the central portion of said end, the walls of said gore being adapted to substantially engage each other when the body member is secured to a handle to cause the lashes to substantially radiate from said end portion of the body member.

In testimony whereof I hereunto affix my signature.

AUG. ROCHWITE.